US012567941B2

(12) United States Patent
Singh et al.

(10) Patent No.: US 12,567,941 B2
(45) Date of Patent: Mar. 3, 2026

(54) CHANNEL SWITCH ANNOUNCEMENT

(71) Applicant: QUALCOMM Incorporated, San Diego, CA (US)

(72) Inventors: Sudhanshu Singh, Hyderabad (IN); Sriman Miryala, Hyderabad (IN); Santhi Swaroop Golti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 18/175,061

(22) Filed: Feb. 27, 2023

(65) Prior Publication Data

US 2024/0291628 A1      Aug. 29, 2024

(51) Int. Cl.
| | |
|---|---|
| *H04L 5/00* | (2006.01) |
| *H04W 72/0453* | (2023.01) |
| *H04W 52/02* | (2009.01) |
| *H04W 56/00* | (2009.01) |

(52) U.S. Cl.
CPC ....... *H04L 5/0098* (2013.01); *H04W 72/0453* (2013.01); *H04W 52/0212* (2013.01); *H04W 56/001* (2013.01)

(58) Field of Classification Search
CPC ............ H04L 5/0098; H04W 72/0453; H04W 52/0212; H04W 56/001; H04W 36/06; H04W 56/0015; H04W 84/18; H04W 52/0216; H04W 36/165; H04W 52/0235; H04W 84/12
See application file for complete search history.

(56) References Cited

U.S. PATENT DOCUMENTS

| | | | |
|---|---|---|---|
| 2003/0171116 A1 | 9/2003 | Soomro | |
| 2012/0311173 A1* | 12/2012 | Agarwal | .............. H04L 41/0896 |
| | | | 709/231 |
| 2014/0036863 A1 | 2/2014 | Lim et al. | |
| 2014/0269671 A1* | 9/2014 | Kalkunte | .............. H04W 28/18 |
| | | | 370/350 |
| 2015/0264589 A1 | 9/2015 | Kalkunte | |
| 2023/0284107 A1* | 9/2023 | Gan | ....................... H04L 41/082 |
| | | | 370/331 |
| 2024/0073773 A1* | 2/2024 | Seok | ...................... H04W 48/12 |
| 2024/0080736 A1* | 3/2024 | Lu | ........................... H04W 88/08 |
| 2024/0260017 A1* | 8/2024 | Lanante | ........... H04W 72/0453 |
| 2024/0267897 A1* | 8/2024 | Haider | .............. H04W 72/0446 |
| 2024/0284180 A1* | 8/2024 | Gupta | ................... H04W 12/73 |

OTHER PUBLICATIONS

International Search Report and Written Opinion—PCT/US2024/013484—ISA/EPO—Jun. 12, 2024.

* cited by examiner

*Primary Examiner* — Yu-Wen Chang
(74) *Attorney, Agent, or Firm* — Harrity & Harrity, LLP

(57) ABSTRACT

Various aspects of the present disclosure generally relate to wireless communication. In some aspects, a wireless communication device may transmit a channel switch announcement indicating a time by which a channel switch is to occur, wherein the time for the channel switch is less than a beacon interval from the time by which the channel switch announcement is transmitted. The wireless communication device may perform the channel switch in accordance with the channel switch announcement. Numerous other aspects are described.

34 Claims, 11 Drawing Sheets

800

810    Transmit, at a first time, a channel switch announcement indicating a second time by which a channel switch is to occur, wherein the second time is less than a beacon interval after the first time 820    Perform the channel switch in accordance with the channel switch announcement

100

200

300

Bus
305

810 Transmit, at a first time, a channel switch announcement indicating a second time by which a channel switch is to occur, wherein the second time is less than a beacon interval after the first time 820 Perform the channel switch in accordance with the channel switch announcement

800

910 — Receive, at a first time, a channel switch announcement indicating a second time by which a channel switch is to occur, wherein the second time is less than a beacon interval after the first time 920 — Perform the channel switch in accordance with the channel switch announcement

900

CHANNEL SWITCH ANNOUNCEMENT

FIELD OF THE DISCLOSURE

Aspects of the present disclosure generally relate to wireless communication and to techniques and apparatuses for channel switch announcement.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network, may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, an STA may communicate with an associated AP via downlink and uplink. "Downlink" may refer to the communication link from the AP to the station, and "uplink" may refer to the communication link from the station to the AP.

The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (WPAN), which may include a Bluetooth connection, may provide for short range wireless connections between two or more paired wireless devices. For example, wireless devices such as cellular phones may utilize WPAN communications to exchange information such as audio signals with wireless headsets.

SUMMARY

Some aspects described herein relate to a method of wireless communication performed by a wireless communication device. The method may include transmitting, at a first time, a channel switch announcement indicating a second time by which a channel switch is to occur, wherein the second time is less than a beacon interval after the first time. The method may include performing the channel switch in accordance with the channel switch announcement.

Some aspects described herein relate to a method of wireless communication performed by a wireless communication device. The method may include receiving, at a first time, a channel switch announcement indicating a second time by which a channel switch is to occur, wherein the second time is less than a beacon interval after the first time. The method may include performing the channel switch in accordance with the channel switch announcement.

Some aspects described herein relate to a wireless communication device for wireless communication. The wireless communication device may include a memory and one or more processors coupled to the memory. The one or more processors may be configured to transmit, at a first time, a channel switch announcement indicating a second time by which a channel switch is to occur, wherein the second time is less than a beacon interval after the first time. The one or more processors may be configured to perform the channel switch in accordance with the channel switch announcement.

Some aspects described herein relate to a wireless communication device for wireless communication. The wireless communication device may include a memory and one or more processors coupled to the memory. The one or more processors may be configured to receive, at a first time, a channel switch announcement indicating a second time by which a channel switch is to occur, wherein the second time is less than a beacon interval after the first time. The one or more processors may be configured to perform the channel switch in accordance with the channel switch announcement.

Some aspects described herein relate to a non-transitory computer-readable medium that stores a set of instructions for wireless communication by a wireless communication device. The set of instructions, when executed by one or more processors of the wireless communication device, may cause the wireless communication device to transmit, at a first time, a channel switch announcement indicating a second time by which a channel switch is to occur, wherein the second time is less than a beacon interval after the first time. The set of instructions, when executed by one or more processors of the wireless communication device, may cause the wireless communication device to perform the channel switch in accordance with the channel switch announcement.

Some aspects described herein relate to a non-transitory computer-readable medium that stores a set of instructions for wireless communication by a wireless communication device. The set of instructions, when executed by one or more processors of the wireless communication device, may cause the wireless communication device to receive, at a first time, a channel switch announcement indicating a second time by which a channel switch is to occur, wherein the second time is less than a beacon interval after the first time. The set of instructions, when executed by one or more processors of the wireless communication device, may cause the wireless communication device to perform the channel switch in accordance with the channel switch announcement.

Some aspects described herein relate to an apparatus for wireless communication. The apparatus may include means for transmitting, at a first time, a channel switch announcement indicating a second time by which a channel switch is to occur, wherein the second time is less than a beacon interval after the first time. The apparatus may include means for performing the channel switch in accordance with the channel switch announcement.

Some aspects described herein relate to an apparatus for wireless communication. The apparatus may include means for receiving, at a first time, a channel switch announcement indicating a second time by which a channel switch is to occur, wherein the second time is less than a beacon interval after the first time. The apparatus may include means for performing the channel switch in accordance with the channel switch announcement.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
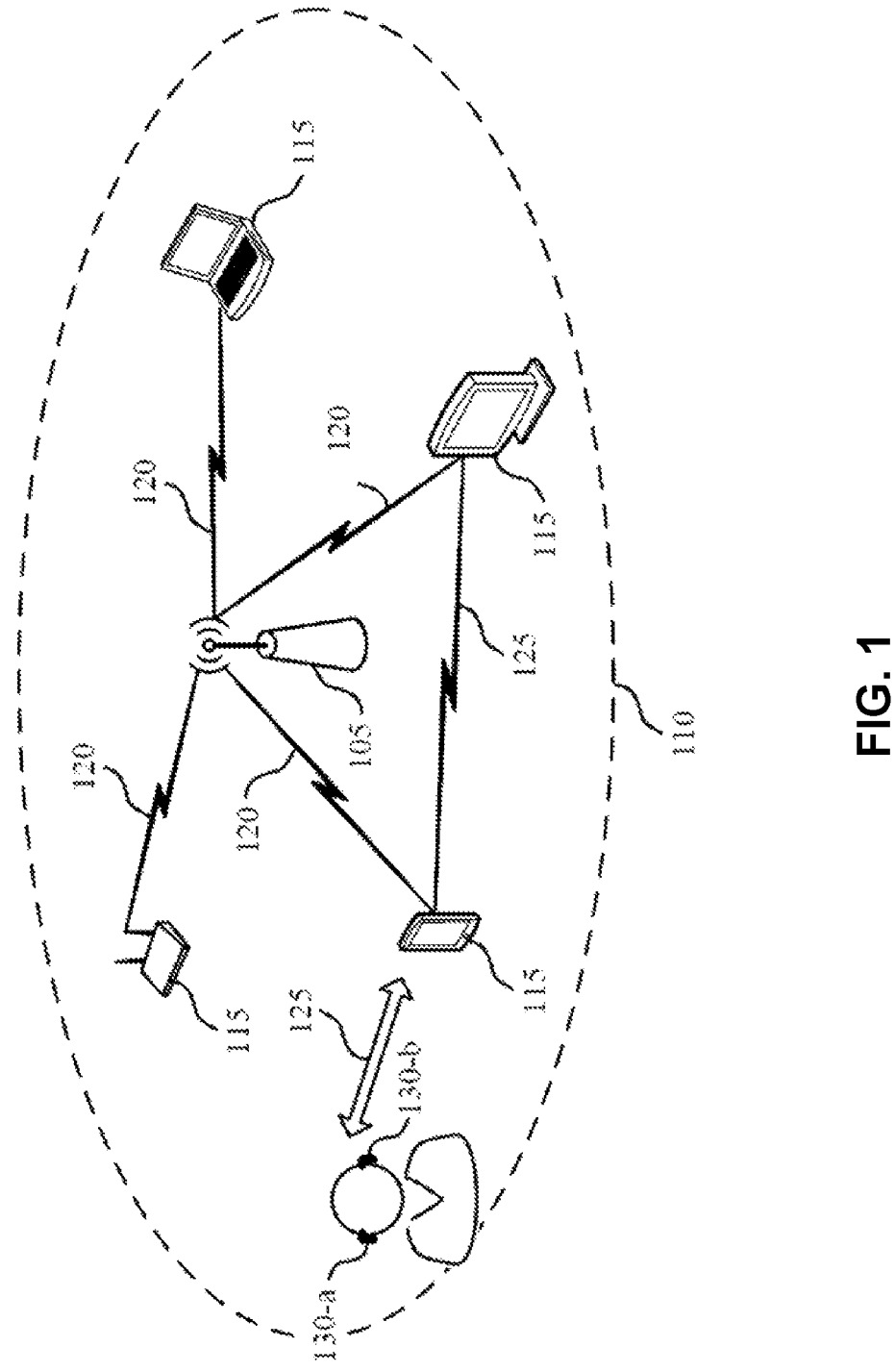
FIG. 1 illustrates a wireless communication system configured in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

In some networks, a wireless communication device may support applications associated with low-latency or lossless audio to one or more other devices, such as one or more personal audio devices. For example, a wireless communication device may support applications and use cases associated with ultra-low latency (ULL), such as ULL gaming, or streaming lossless audio to one or more personal audio devices (e.g., peripheral devices) of a user. In scenarios in which a user uses two peripheral devices, the wireless communication device may support an extended personal area network (XPAN) via which the wireless communication device may communicate with the two peripheral devices. To meet latency or lossless criteria associated with an application or use case, XPAN devices may employ a target wake time (TWT) technique for communication between the wireless communication device and the peripheral devices. XPAN devices may use a short duration TWT scheme to achieve timing synchronization between stations and access points. In order to achieve reliability and quality-of-service requirements for XPAN communications, an access point may trigger associated wireless communication devices to move to a new channel after detecting that a current channel's channel metric has dropped below a threshold. Such channel switches may occur within tens of milliseconds after detecting that the current channel's channel metric has dropped below the threshold.

However, methods for switching channels in some networks may rely on either immediate switching after transmission/reception of a channel switch announcement, or switching at a future time corresponding to a number of beacon intervals (where a beacon interval is an interval separating consecutive beacon transmissions by an access point). Immediate switching may be unsuitable for XPAN networks in which multiple peripheral devices are associated with a single access point. For example, a peripheral device may receive a channel switch announcement with a channel switch count as zero (i.e., an immediate channel switch announcement) and may immediately switch the channel, whereas an access point may take a longer amount of time to switch due to firmware, hardware, and/or software channel switch time delay. Also, if the channel switch announcement is transmitted at the end of the TWT service period (SP), an access point may not have enough time to move to a new channel, considering such delays. Furthermore, when multiple peripheral devices are active, a situation may arise in which one peripheral device receives the channel switch announcement and immediately switches the channel, whereas a second peripheral device fails to receive the channel switch announcement and thus does not immediately switch, thereby causing the two peripheral devices and the access point to lose synchronization with respect to the channel. Thus, movement to a new channel may benefit from being performed in a coordinated manner so that the movement aligns with a TWT SP start time. Switching according to a number of beacon intervals may incur significant delay (since beacon intervals are typically on the order of 100 ms), which leads to interruption of services, dropped traffic, and failure to satisfy latency and quality-of-service requirements. Furthermore, some methods of channel switch announcement (e.g., according to a number of beacon intervals) may not provide a mechanism to provide a coarser timing interval than a target beacon transmission time (TBTT) (e.g., a beacon interval).

Some techniques described herein provide an indication, via a channel switch announcement, of a time by which a channel switch is to occur. The time may occur less than a beacon interval after the time at which the channel switch announcement was transmitted, and may occur after a time associated with an immediate channel switch. Thus, wireless communication devices can perform the channel switch at an indicated time in the future, and sooner than a next beacon interval, which improves reliability of communications relative to an immediate switch (which may be problematic if a second wireless communication device fails to receive the channel switch announcement or a first wireless communication device incurs delay in switching the channel). Furthermore, the channel switch can occur within the length of a beacon interval, which reduces interruption relative to waiting for a beacon interval to elapse, thereby improving reliability and user experience.

FIG. 1 shows a block diagram of an example wireless communication system 100. According to some aspects, the wireless communication system 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 105 and multiple wireless devices 115. Device 115 may be a STA, in some examples. While only one AP 105 is shown in FIG. 1, the WLAN 100 also can include multiple APs 105. AP 105 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the devices 115 also may be referred to as a mobile station (MS), a mobile device, a mobile handset, a wireless handset, an access terminal (AT), a user equipment (UE), a subscriber station (SS), or a subscriber unit, among other examples. The devices 115 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various devices 115 in the network are able to communicate with one another via the AP 105.

A single AP 105 and an associated set of devices 115 may be referred to as a basic service set (BSS), which is managed by the respective AP 105. FIG. 1 additionally shows an example coverage area 110 of the AP 105, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 105. The AP 105 may periodically broadcast beacon frames ("beacons") including the BSSID to enable any devices 115 within wireless range of the AP 105 to "associate" or re-associate with the AP 105 to establish a respective communication link 120 (hereinafter also referred to as a "Wi-Fi link"), or to maintain a communication link 120, with the AP 105. For example, the beacons can include an identification or indication of a primary channel used by the respective AP 105 as well as a timing synchronization function for establishing or maintaining timing synchronization with the AP 105. The AP 105 may provide access to external networks to various devices 115 in the WLAN via respective communication links 120.

To establish a communication link 120 with an AP 105, each of the devices 115 is configured to perform passive or active scanning operations ("scans") on frequency channels in one or more frequency bands (for example, the 2.4 GHz, 5 GHZ, 6 GHz or 60 GHz bands). To perform passive scanning, a device 115 listens for beacons, which are transmitted by respective APs 105 at a periodic time interval referred to as the target beacon transmission time (TBTT) (measured in time units (TUs) where one TU may be equal to 1024 microseconds (μs)). To perform active scanning, a device 115 generates and sequentially transmits probe requests on each channel to be scanned and listens for probe responses from APs 105. Each device 115 may identify, determine, ascertain, or select an AP 105 with which to associate in accordance with the scanning information obtained through the passive or active scans, and to perform authentication and association operations to establish a communication link 120 with the selected AP 105. The AP 105 assigns an association identifier (AID) to the device 115 at the culmination of the association operations, which the AP 105 uses to track the device 115.

As a result of the increasing ubiquity of wireless networks, a device 115 may have the opportunity to select one of many BSSs within range of the STA or to select among multiple APs 105 that together form an extended service set (ESS) including multiple connected BSSs. An extended network station associated with the WLAN 100 may be connected to a wired or wireless distribution system that may allow multiple APs 105 to be connected in such an ESS. As such, a device 115 can be covered by more than one AP 105 and can associate with different APs 105 at different times for different transmissions. Additionally, after association with an AP 105, a device 115 also may periodically scan its surroundings to find a more suitable AP 105 with which to associate. For example, a device 115 that is moving relative to its associated AP 105 may perform a "roaming" scan to find another AP 105 having more desirable network characteristics such as a greater received signal strength indicator (RSSI) or a reduced traffic load.

In some cases, devices 115 may form networks without APs 105 or other equipment other than the devices 115 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the devices 115 may be capable of communicating with each other through the AP 105 using communication links 120, devices 115 also can communicate directly with each other via direct wireless communication links 110. Additionally, two devices 115 may communicate via a direct communication link 110 regardless of whether both devices 115 are associated with and served by the same AP 105. In such an ad hoc system, one or more of the devices 115 may assume the role filled by the AP 105 in a BSS. Such a device 115 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 105 and devices 115 may function and communicate (via the respective communication links 120) according to one or more of the IEEE 802.11 family of wireless communication protocol standards. These standards define the WLAN radio and baseband protocols for the PHY and MAC layers. The APs 105 and devices 115 transmit and receive wireless communications (hereinafter also referred to as "Wi-Fi communications" or "wireless packets") to and from one another in the form of PHY protocol data units (PPDUs). The APs 105 and devices 115 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 105 and devices 115 described herein also may communicate in other frequency bands, such as the 5.9 GHZ and the 6 GHz bands, which may support both licensed and unlicensed communications. The APs 105 and devices 115 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

"Bluetooth communications" may refer to a short-range communication protocol and may be used to connect and exchange information between devices 115 and paired devices 115 (e.g., between mobile phones, computers, digital cameras, wireless headsets, speakers, keyboards, mice or other input peripherals, and similar devices). Bluetooth systems (e.g., aspects of wireless communication system 100) may be organized using a central-peripheral relationship employing a time-division duplex protocol having, for example, defined time slots of 625 microseconds, in which transmission alternates between the central device (e.g., a device 115) and one or more peripheral devices (e.g., paired devices 115). In some examples, "device 115" may generally refer to a central device, and "paired device 115" may refer to a peripheral device in the wireless communication system 100. Therefore, in some examples, a device may be referred to as either a device 115 or a paired device 115 based on the Bluetooth role configuration of the device. That is, designation of a device as either a device 115 or a paired device 115 may not necessarily indicate a distinction in device capability, but rather may refer to or indicate roles held by the device in the wireless communication system 100. Generally, "device 115" may refer to a wireless communication device capable of wirelessly exchanging data signals with another device (e.g., a paired device 115), and "paired device 115" may refer to a device operating in a peripheral role, or to a short-range wireless communication device capable of exchanging data signals with the device 115 (e.g., using Bluetooth communication protocols).

A communication link 125 may be established between two Bluetooth-enabled devices (e.g., between a device 115 and a paired device 115) and may provide for communications or services (e.g., according to some Bluetooth profiles). The controller stack may be responsible for setting up communication links 125, such as asynchronous connection-oriented links (or asynchronous connection-oriented connections), synchronous connection-oriented (SCO) links (or SCO connections), extended synchronous connection-oriented (eSCO) links (or eSCO connections), other logical transport channel links, etc. For example, a Bluetooth connection may be an eSCO connection for voice calls (e.g., which may allow for retransmission), an asynchronous connection-less (ACL) connection for music streaming (e.g., advanced audio distribution profile (A2DP)), etc. eSCO packets may be transmitted in predetermined time slots (e.g., 6 Bluetooth slots each for eSCO). The regular interval between the eSCO packets may be specified when the Bluetooth link is established. The eSCO packets to/from a specific device (e.g., paired device 115) are acknowledged and may be retransmitted if not acknowledged during a retransmission window. In addition, audio may be streamed between a device 115 and a paired device 115 using an ACL connection (e.g., an A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (e.g., providing considerably reduced power consumption and cost while maintaining a similar communication range), human interface device (HID) profile (e.g., providing low latency links with low power requirements), etc.

A device may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 115 may support WLAN communications via AP 105 (e.g., over communication links 120). The AP 105 and the associated devices 115 may represent a BSS or an ESS. The various devices 115 in the network may be able to communicate with one another through the AP 105. In some cases, the AP 105 may be associated with a coverage area, which may represent a BSA.

Devices 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100, and devices may communicate with each other via communication links 120 (e.g., Wi-Fi Direct connections, Wi-Fi TDLS links, peer-to-peer communication links, or other peer or group connections). AP 105 may be coupled to a network (such as the Internet) and may enable a device 115 to communicate via the network (or communicate with other devices 115 coupled to the AP 105). A device 115 may communicate with a network device bi-directionally. For example, in a WLAN, a device 115 may communicate with an associated AP 105 via downlink (e.g., the communication link from the AP 105 to the device 115) and uplink (e.g., the communication link from the device 115 to the AP 105).

In some examples, content, media, audio, etc. exchanged between a device 115 and a paired device 115 may originate from a WLAN. For example, in some examples, device 115 may receive audio from an AP 105 (e.g., via WLAN communications), and the device 115 may then relay or pass the audio to the paired device 115 (e.g., via Bluetooth communications). In some examples, certain types of Bluetooth communications (e.g., such as high quality or high definition (HD) Bluetooth) may require enhanced quality of service. For example, in some examples, delay-sensitive Bluetooth traffic may have a higher priority than WLAN traffic.

In some deployments, a wireless communication device may support applications associated with low-latency or lossless audio with one or more other devices, such as one or more personal audio devices. For example, a wireless communication device may support applications and use cases associated with ULL, such as ULL gaming, or streaming lossless audio to one or more personal audio devices (e.g., peripheral devices) of a user. In scenarios in which a user uses two peripheral devices (e.g., a wireless earbud 130-*a* and a wireless earbud 130-*b*), the wireless communication device may support an XPAN via which the wireless communication device may communicate with the two peripheral devices.

As indicated above, FIG. 1 is provided as an example. Other examples may differ from what is described with regard to FIG. 1.

Figure 2:
FIG. 2 illustrates an example of a wireless communication system that supports channel switching for extended personal area networks in accordance with the present disclosure.
Figure 2:

FIG. 2 illustrates an example of a wireless communication system 200 that supports channel switching for extended personal area networks in accordance with the present disclosure. The wireless communication system 200 may implement or be implemented to realize aspects of the wireless communication system 100. For example, the wireless communication system 200 illustrates communication between an AP 105, a device 115 (e.g., a handset or handheld device), and peripheral devices 130, including (in this example) a wireless earbud 130-a and a wireless earbud 130-b associated with a user 205 (e.g., examples of audio devices and/or peripheral devices), which may be examples of corresponding devices as illustrated by and described with reference to FIG. 1. In some implementations, the device 115, the wireless earbud 130-a, and the wireless earbud 130-b may support a signaling-based mechanism according to which the device 115 may transmit an indication of a set of updated parameters to each of the wireless earbud 130-a and the wireless earbud 130-b via one or more audio data packets.

In some deployments, the device 115 may communicate with the AP 105 via one or both of a link 210-a or a link 210-b, which may be examples of infrastructure links between the AP 105 and the device 115. The link 210-a may be an example of a 2.4 GHz link between the AP 105 and the device 115, and the link 210-b may be an example of a 5 GHz link or a 6 GHz link between the AP 105 and the device 115. Further, the device 115 may communicate wirelessly with each of the wireless earbud 130-a and the wireless earbud 130-b, where each of the wireless earbud 130-a and the wireless earbud 130-b may be associated with an XPAN of the device 115. For example, the device 115 may communicate with the wireless earbud 130-a via a link 215-a and may communicate with the wireless earbud 130-b via a link 215-b, where the link 215-a and the link 215-b may be referred to or understood as XPAN links. The link 215-a may be an example of a 5 GHz link or a 6 GHz link and the link 215-b may be an example of a 5 GHz link or a 6 GHz link. Additionally, in some examples, the device 115 may communicate with the wireless earbud 130-a, which may be an example of a primary earbud, via a communication link 220. The communication link 220 may be an example of a Bluetooth link between the device 115 and the wireless earbud 130-a. The wireless earbud 130-a and the wireless earbud 130-b, which may be an example of a secondary earbud, may communicate with each other via a link 225, which may be an example of a Bluetooth link between the wireless earbud 130-a and the wireless earbud 130-b.

In some cases, the device 115, the wireless earbud 130-a, and the wireless earbud 130-b may support or belong to an XPAN and may use the XPAN to support one or more applications or use cases, such as applications or use cases associated with latency or lossless audio constraints or criteria. For example, the device 115 may support one or more use cases of ULL gaming and streaming lossless audio to the wireless earbud 130-a and the wireless earbud 130-b (e.g., personal devices of the device 115). For such applications, the device 115 may be expected to keep end-to-end latency below a relatively stringent latency target (e.g., 40 ms for ULL gaming). Further, the device 115 may also be tasked with handling (e.g., gracefully handling) a coexistence of XPAN traffic (e.g., traffic to or from one or both of the wireless earbud 130-a and the wireless earbud 130-b) with other concurrency scenarios that the user 205 or the system may initiate. Such other concurrency scenarios may include a scan concurrency for channel selection, STA infrastructure link concurrency for online gaming or other traffic to or from the AP 105, or neighbor aware networking (NAN) discovery and NAN data transfer, or any combination thereof.

The device 115 may be expected to meet a latency constraint for various applications or use cases (e.g., an ultra-low-latency constraint for a ULL gaming use case) and also facilitate coexistence between XPAN and other concurrency scenarios on the device 115. To meet the latency constraints associated with, for example, ULL gaming, a power constraint of the wireless earbud 130-a and the wireless earbud 130-b, and/or power and concurrency constraints at the device 115, the device 115 may employ a TWT technique for the communication between the device 115 (which may act or function as an SAP) and each of the wireless earbud 130-a and wireless earbud 130-b (which may act or function as STAs).

Example TWT parameters include a TWT 230, a TWT service interval (SI) 235, and a TWT service period (SP) 240. A TWT 230 may indicate or be associated with a timing synchronization function (TSF) time indicating a start or beginning of a first TWT service period. A TWT SI 235 may indicate a TWT interval, which may refer to a time difference between a start or beginning of two consecutive TWT service periods. A TWT service period (SP) 240 may indicate a duration during which one or both of the wireless earbud 130-a and the wireless earbud 130-b are awake during a TWT SI 235. In some aspects, a TWT SP 240 may be referred to or understood as a TWT session. As illustrated by FIG. 2, the TWT SI 235 may indicate a time difference between a TWT SP 240-a and a TWT 240-b. A remainder of time within a TWT SI 235 excluding a TWT SP 240 may be referred to or understood as a concurrency time 245 during which the device 115 may perform any operations (e.g., transmission or reception) associated with a concurrency scenario at the device 115. In other words, the difference between XPAN TWT SI 235 and XPAN TWT SP 240 may be the time left for the device 115 to support other concurrencies (e.g., outside of any channel switching or software overheads).

For XPAN, each of the wireless earbud 130-a and the wireless earbud 130-b (which may be examples of TWT requesting STAs) may initiate a TWT session with the device 115 (which may be an example of a TWT responding STA). Further, for low-latency use cases (e.g., ULL gaming use cases), a target end-to-end latency may be relatively stringent (e.g., less than or equal to approximately 40 ms), which may be tied to, associated with, or expect a Wi-Fi latency in a specific range (e.g., in the sub-10 ms range). To achieve such a Wi-Fi latency, a TWT SI 235 and a TWT SP 240 may be selected or set to specific values (e.g., a TWT SI 235 may be set to 4 ms with a TWT SP 240 of 2 ms). Further, for a lossless audio use case, for example, a TWT SI 235 may be set to approximately 70 ms with a TWT SP 240 of approximately 23 ms.

As indicated above, FIG. 2 is provided as an example. Other examples may differ from what is described with regard to FIG. 2.

Figure 3:
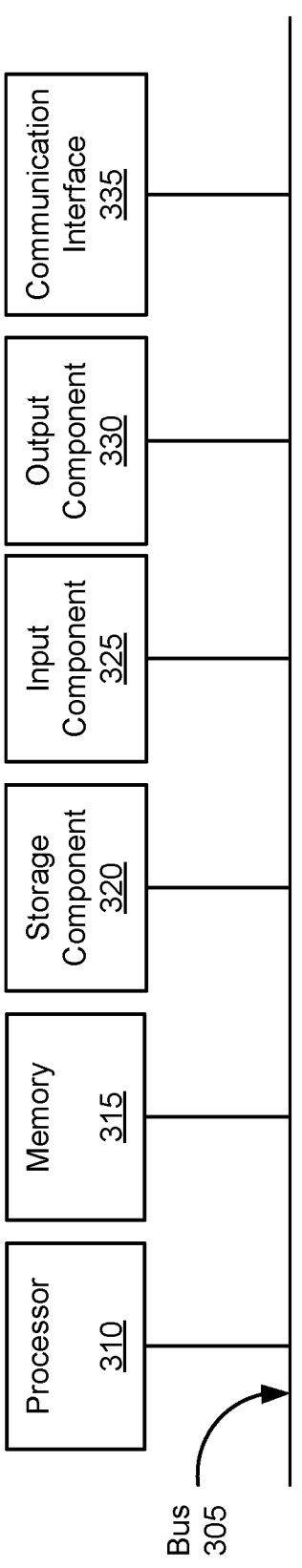
FIG. 3 is a diagram illustrating example components of a device, in accordance with the present disclosure.

FIG. 3 is a diagram illustrating example components of a device 300, in accordance with the present disclosure. Device 300 may correspond to AP 105, device 115, and/or wireless earbud 130. In some aspects, AP 105, device 115, and/or wireless earbud 130 may include one or more devices 300 and/or one or more components of device 300. As shown in FIG. 3, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a component for determining a position or a location of device 300 (e.g., a global positioning system (GPS) component or a global navigation satellite system (GNSS) component) and/or a sensor for sensing information (e.g., an accelerometer, a gyroscope, an actuator, or another type of position or environment sensor). Output component 330 includes a component that provides output information from device 300 (e.g., a display, a speaker, a haptic feedback component, and/or an audio or visual indicator).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 300 may include means for transmitting, at a first time, a channel switch announcement indicating a second time by which a channel switch is to occur, wherein the second time is less than a beacon interval after the first time; and/or means for performing the channel switch in accordance with the channel switch announcement. In some aspects, device 300 may include means for receiving, at a first time, a channel switch announcement indicating a second time by which a channel switch is to occur, wherein the second time is less than a beacon interval after the first time; and/or means for performing the channel switch in accordance with the channel switch announcement. In some aspects, the means for device 300 to perform processes and/or operations described herein may include one or more components of device 300 described in connection with FIG. 3, such as bus 305, processor 310, memory 315, storage component 320, input component 325, output component 330, and/or communication interface 335.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
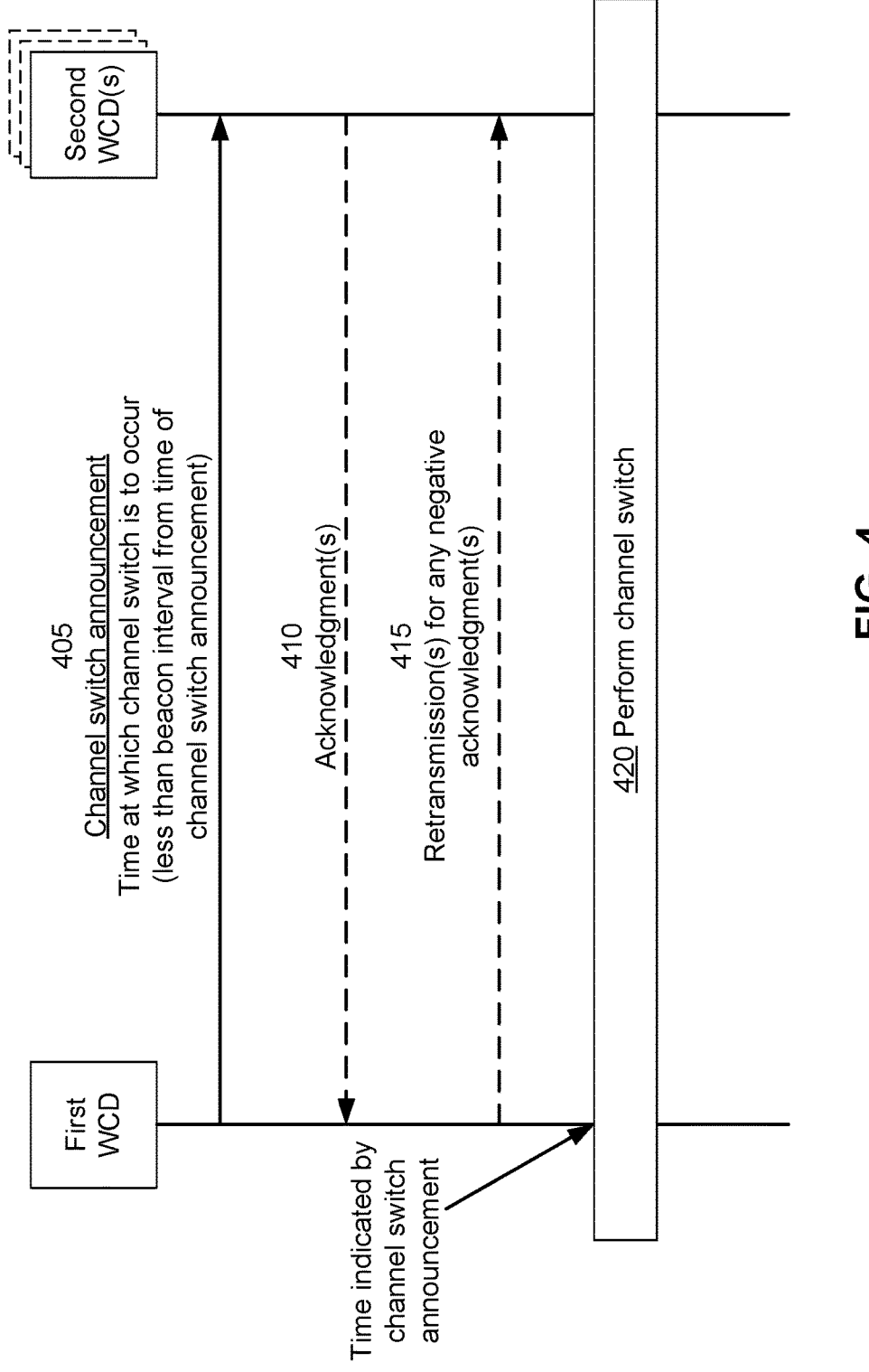
FIG. 4 is a diagram illustrating an example of signaling for a channel switch announcement, in accordance with the present disclosure.

FIG. 4 is a diagram illustrating an example 400 of signaling for a channel switch announcement, in accordance with the present disclosure. Example 400 includes a first wireless communication device (e.g., AP 105 or device 115) and one or more second wireless communication devices (e.g., AP 105, device 115, or a peripheral device such as wireless earbud 130). In some examples, the first wireless communication device may include an AP such as a soft AP (SAP) and the one or more second wireless communication devices may include one or more stations such as one or more peripheral devices.

As shown in FIG. 4, the first wireless communication device may transmit a channel switch announcement 405. The one or more second wireless communication devices may receive the channel switch announcement 405, though in some cases, a second wireless communication device of the one or more second wireless communication devices may fail to receive the channel switch announcement 405, as described elsewhere herein. As further shown, the channel switch announcement 405 may indicate a time (sometimes referred to herein as a second time) by which a channel switch, triggered by the channel switch announcement 405, is to occur. For example, the time may indicate a time by which the channel switch is to be completed. In some aspects, the time may be in terms of a number of target wake time (TWT) service intervals (e.g., TWT SI 235). In some other aspects, the time may be in terms of a timing synchronization function (TSF) time. Additional detail regarding the content of the channel switch announcement 405 is provided in connection with FIG. 7. In some aspects, the first wireless communication device may transmit the channel switch announcement via an XPAN. In some aspects, the channel switch announcement 405 may indicate a second channel associated with the XPAN, which may trigger the one or more second wireless communication devices to switch from a first channel associated with the XPAN to a second channel associated with the XPAN. Switching to a second channel may involve reconfiguring hardware, software, and/or firmware so that a wireless communication device partially or completely stops transmitting and receiving on the first channel and/or starts (or prepares to start) transmitting and receiving on the second channel.

The time may be less than a beacon interval from a time (sometimes referred to herein as a first time) by which the channel switch announcement 405 is transmitted by the first wireless communication device and/or received by a second wireless communication device. For example, a beacon interval may have a configurable length, and may often be configured as approximately 100 ms (e.g., 100 time units, or approximately 102.4 ms). The time (which may be in terms of TWT service intervals or a TSF time) may occur within, at most, the length of a beacon interval. For example, the time may occur after transmission of the channel switch announcement 405 (e.g., the channel switch may not be an immediate channel switch that would occur upon an immediate channel switch opportunity) and within the length of a beacon interval after the transmission. Thus, the first wireless communication device and the one or more second wireless communication devices can perform the channel switch at an indicated time in the future and sooner than an end of a next beacon interval (e.g., a next beacon frame), which improves reliability of communications relative to an immediate switch (which may be problematic if a second wireless communication device fails to receive the channel switch announcement 405 or the first wireless communication device incurs delay in switching the channel). Furthermore, the channel switch can occur within a beacon interval, which reduces interruption relative to waiting for a beacon interval to elapse, thereby improving reliability and user experience.

As shown by reference number 410, in some aspects, a second wireless communication device may optionally transmit, and the first wireless communication device may receive, an acknowledgment (ACK). The ACK may indicate that the corresponding second wireless communication device received the channel switch announcement 405. The absence of an ACK, or the transmission and reception of a negative ACK (NACK), may indicate that the corresponding second wireless communication device did not receive the second channel switch announcement 405. As shown by reference number 415, in some aspects, the first wireless communication device may retransmit, prior to the time by which the channel switch is to occur, the channel switch announcement 405. For example, the first wireless communication device may retransmit the channel switch announcement 405 based at least in part on identifying that an ACK has not been received from a particular second wireless communication device. Additionally, or alternatively, the first wireless communication device may perform the channel switch at the time indicated by the channel switch announcement 405. For example, the first wireless communication device may perform the channel switch irrespective of whether an ACK has been received from a particular second wireless communication device. Thus, the channel switch can still occur in a situation where the particular second wireless communication device received the channel switch announcement 405 but a transmission of an ACK regarding the channel switch announcement 405 failed.

In some aspects, the time by which the channel switch is to occur may be based at least in part on a retransmission opportunity. For example, the first wireless communication device may configure the time such that one or more retransmission opportunities occur between the transmission of the channel switch announcement 405. In some aspects, the first wireless communication device may configure the time to be greater than a threshold time value. Thus, the first wireless communication device may set the time sufficiently in the future such that the one or more second wireless communication devices have one or more opportunities to receive a retransmission of the channel switch announcement 405.

As shown by reference number 420, the first wireless communication device, and the one or more second wireless communication devices, may perform the channel switch in accordance with the channel switch announcement 405. For example, the first wireless communication device and the one or more second wireless communication devices may switch to a channel indicated by the channel switch announcement 405 no later than the time indicated by the channel switch announcement 405. As another example, the first wireless communication device and/or the one or more second wireless communication devices may perform a communication on the channel indicated by the channel switch announcement 405 at the time (e.g., in a TWT service period corresponding to the time).

As indicated above, FIG. 4 is provided as an example. Other examples may differ from what is described with regard to FIG. 4.

Figure 5:
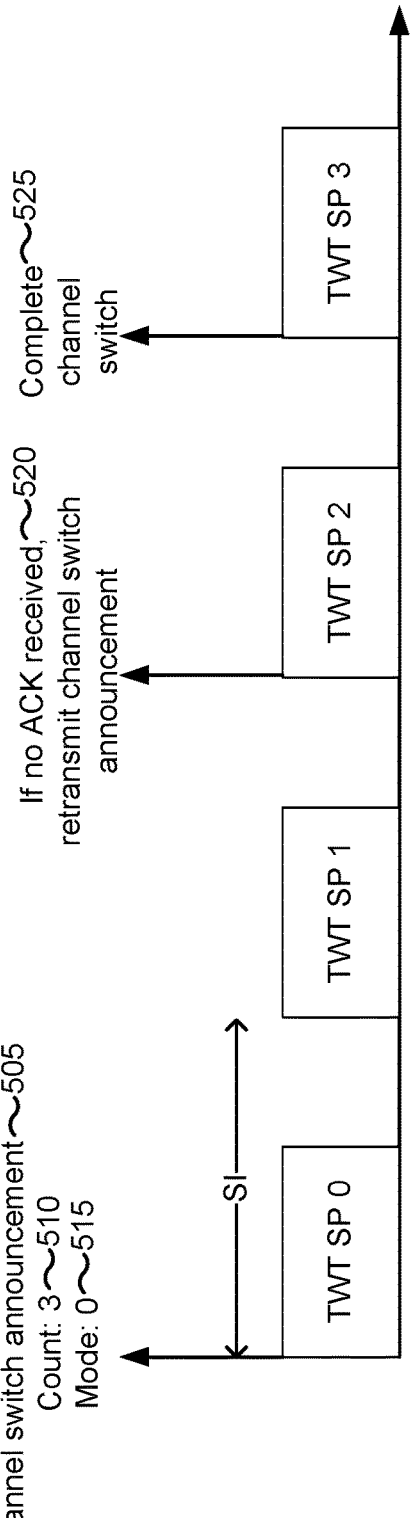
FIG. 5 is a diagram illustrating an example of channel switching using a time in terms of target wake time service intervals, in accordance with the present disclosure.

FIG. 5 is a diagram illustrating an example 500 of channel switching using a time in terms of TWT service intervals, in accordance with the present disclosure. In FIG. 5, the horizontal axis represents time. Example 500 shows a series of TWT service periods (SPs) that are timed in accordance with a TWT SI. As shown, a wireless communication device (e.g., the first wireless communication device of FIG. 4) may transmit a channel switch announcement 505 (e.g., channel switch announcement 405). As shown by reference number 510, the channel switch announcement 505 may indicate a TWT service interval by which the channel switch is to occur. In example 500, the channel switch announcement 505 includes a count value (e.g., 3) indicating that the channel switch is to occur by (e.g., no later than) a third upcoming TWT SP (shown as TWT SP 3). As shown by reference number 515, the channel switch announcement 505 includes an indication of whether the channel switch announcement 505 indicates the time by indicating a TWT service interval (as in example 500) or a timing synchronization function time (described in connection with FIG. 6). For example, the indication may comprise a bit. In example 500, the bit is set to a value indicating that the channel switch announcement 505 indicates a TWT service interval.

As shown by reference number 520, in some aspects, the wireless communication device may retransmit the channel switch announcement 505 if the wireless communication device has not received an ACK prior to the time indicated by the channel switch announcement 505. As shown by reference number 525, the wireless communication device may perform (e.g., complete) a channel switch by the time indicated by the channel switch announcement 505.

As indicated above, FIG. 5 is provided as an example. Other examples may differ from what is described with regard to FIG. 5.

Figure 6:
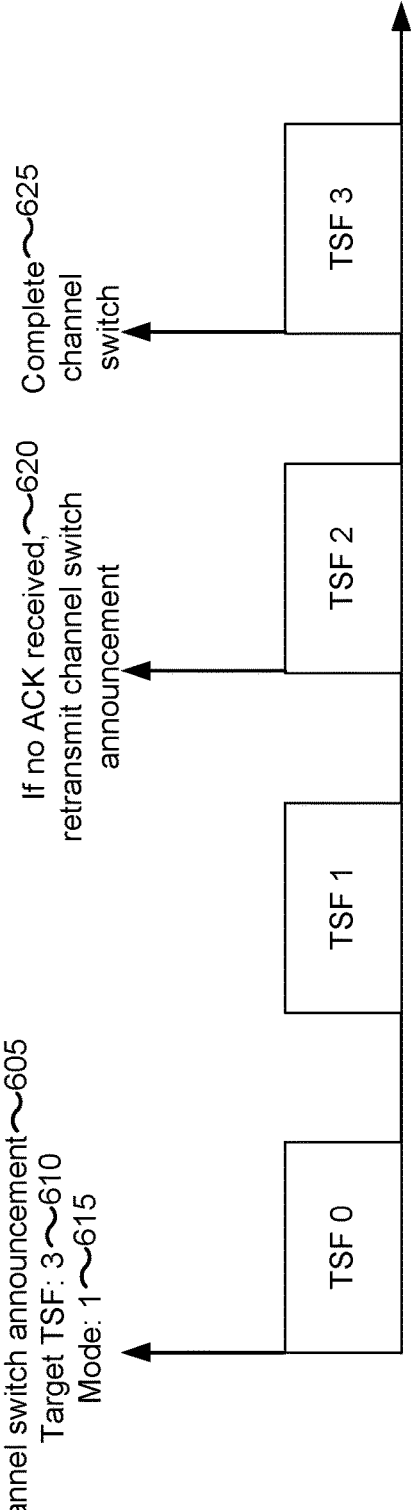
FIG. 6 is a diagram illustrating an example of channel switching using a time in terms of time synchronization function times, in accordance with the present disclosure.

FIG. 6 is a diagram illustrating an example 600 of channel switching using a time in terms of TSF times, in accordance with the present disclosure. In FIG. 6, the horizontal axis represents time. Example 600 shows a series of TSF times. As shown, a wireless communication device (e.g., the first wireless communication device of FIG. 4) may transmit a channel switch announcement 605 (e.g., channel switch announcement 405). As shown by reference number 610, the channel switch announcement 605 may indicate a target TSF time by which the channel switch is to occur. In example 600, the channel switch announcement 605 indicates that the channel switch is to occur by (e.g., no later than) a TSF time 3. As shown by reference number 615, the channel switch announcement 605 includes an indication of whether the channel switch announcement 605 indicates the time by indicating a TWT service interval (described in connection with FIG. 5) or a TSF time (as in example 600). For example, the indication may comprise a bit. In example 600, the bit is set to a value indicating that the channel switch announcement 605 indicates a TSF time.

As shown by reference number 620, in some aspects, the wireless communication device may retransmit the channel switch announcement 605 if the wireless communication device has not received an ACK prior to the time indicated by the channel switch announcement 605. As shown by reference number 625, the wireless communication device may perform (e.g., complete) a channel switch at the time indicated by the channel switch announcement 605.

As indicated above, FIG. 6 is provided as an example. Other examples may differ from what is described with regard to FIG. 6.

Figure 7:
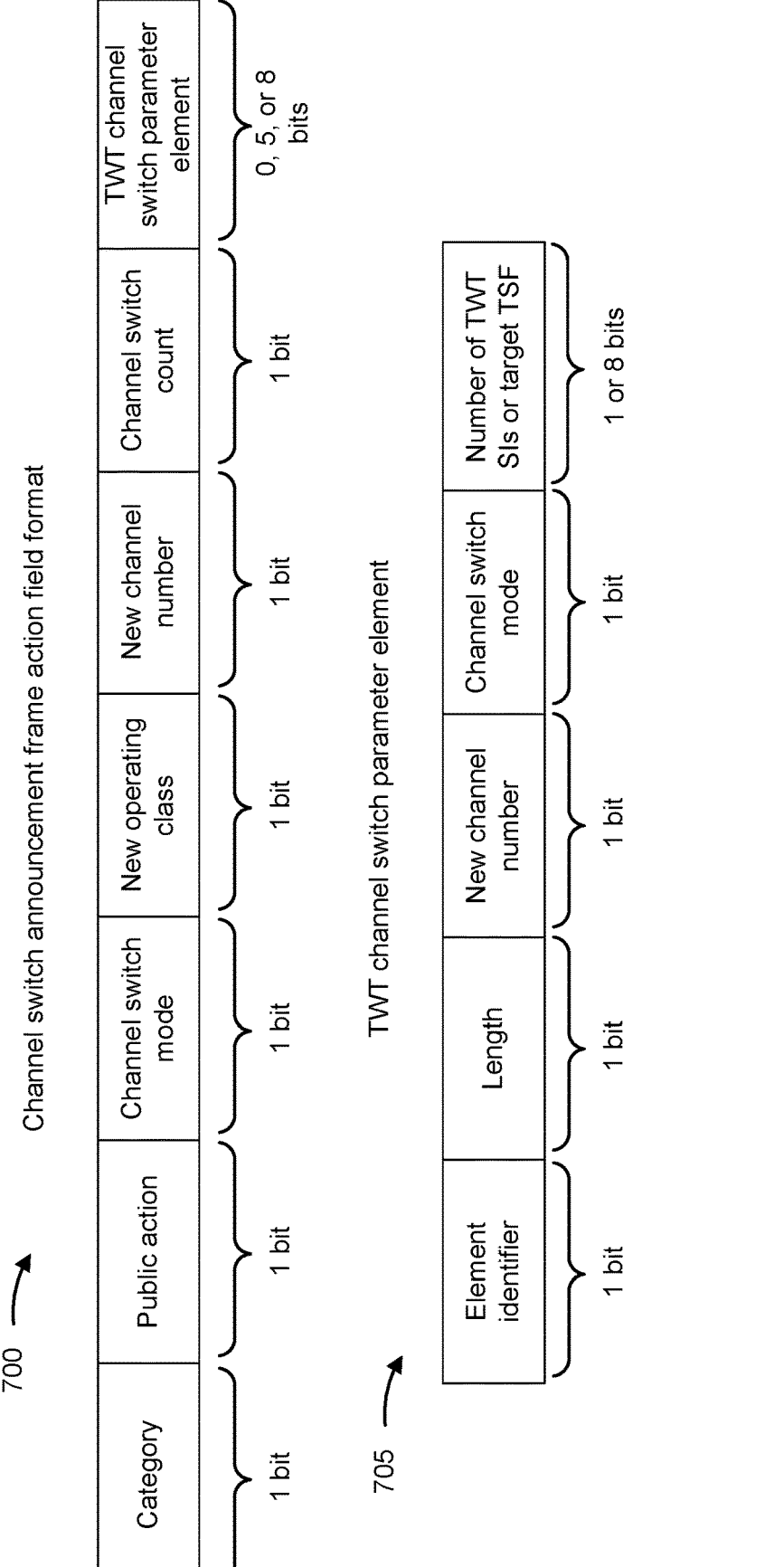
FIG. 7 is a diagram illustrating an example of a format for a channel switch announcement frame and a format for a channel switch parameter element of the channel switch announcement frame, in accordance with the present disclosure.

FIG. 7 is a diagram illustrating an example of a format 700 for a channel switch announcement frame and a format 705 for a channel switch parameter element of the channel switch announcement frame, in accordance with the present disclosure. The formats shown by example 700 may be used for channel switch announcement 405, channel switch announcement 505, or channel switch announcement 605. For example, a channel switch announcement frame may include the channel switch announcement 405, channel switch announcement 505, or channel switch announcement 605. As shown by the format 700, the channel switch announcement frame may include a category field, a public action field (indicating whether the channel switch announcement frame is a public action frame), a channel switch mode field, a new operating class field (indicating a bandwidth of a BSS after moving to a new channel), a new channel number field, a channel switch count field, and the channel switch parameter element. As shown by the format 705, the channel switch announcement element may include an element identifier field, a length field, a new channel number field, a channel switch mode field, and a field indicating a time (e.g., via a number of TWT SIs or a target TSF time). The new channel number field may indicate a channel to which the one or more second wireless communication devices are to switch (e.g., on which the one or more second wireless communication devices are to transmit and receive). The channel switch mode may include an indication of whether the channel switch announcement 605 indicates the time by indicating a TWT service interval (described in connection with FIG. 5) or a TSF time (as in example 600). The field indicating the time may indicate a number of TWT SIs after which the one or more second wireless communication devices are expected to be on the indicated channel, or a TSF time after which the one or more second wireless communication devices are expected to be on the indicated channel.

As indicated above, FIG. 7 is provided as an example. Other examples may differ from what is described with regard to FIG. 7.

Figure 8:
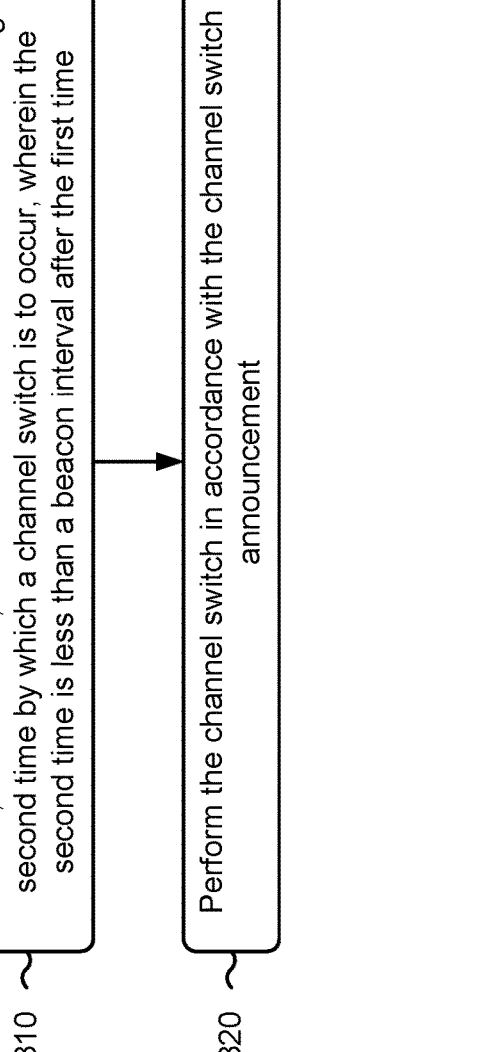
FIG. 8 is a diagram illustrating an example process performed, for example, by a wireless communication device, in accordance with the present disclosure.

FIG. 8 is a diagram illustrating an example process 800 performed, for example, by a wireless communication device, in accordance with the present disclosure. Example process 800 is an example where the wireless communication device (e.g., access point 105, device 115) performs operations associated with a channel switch announcement.

As shown in FIG. 8, in some aspects, process 800 may include transmitting, at a first time, a channel switch announcement indicating a second time by which a channel switch is to occur, wherein the second time is less than a beacon interval after the first time (block 810). For example, the wireless communication device (e.g., using transmission component 1004 and/or communication manager 1006, depicted in FIG. 10) may transmit, at a first time, a channel switch announcement indicating a second time by which a channel switch is to occur, wherein the second time is less than a beacon interval after the first time. In some aspects, the transmitting of the channel switch announcement may be performed in a manner similar to transmission of the channel switch announcement 405 of FIG. 4, the channel switch announcement 505 of FIG. 5, and/or the channel switch announcement 605 of FIG. 6. The channel switch announcement may include information similar to that described in connection with FIG. 7.

As further shown in FIG. 8, in some aspects, process 800 may include performing the channel switch in accordance with the channel switch announcement (block 820). For example, the wireless communication device (e.g., using communication manager 1006, depicted in FIG. 10) may perform the channel switch in accordance with the channel switch announcement, as described above. In some aspects, the channel switch may be performed in a manner similar to that described in connection with the channel switch at 420 of FIG. 4, the channel switch at 525 of FIG. 5, and/or the channel switch at 625 of FIG. 6.

Process 800 may include additional aspects, such as any single aspect or any combination of aspects described below and/or in connection with one or more other processes described elsewhere herein.

In a first aspect, the channel switch announcement indicates the second time by indicating a target wake time service interval by which the channel switch is to occur, e.g., as described in connection with FIG. 4 through FIG. 7.

In a second aspect, alone or in combination with the first aspect, the channel switch announcement indicates a number of target wake time service intervals between the channel switch announcement and the target wake time service interval by which the channel switch is to occur, e.g., as described in connection with FIG. 4 through FIG. 7.

In a third aspect, alone or in combination with one or more of the first and second aspects, the channel switch announcement indicates the second time by indicating a timing synchronization function time by which the channel switch is to occur, e.g., as described in connection with FIG. 4 through FIG. 7.

In a fourth aspect, alone or in combination with one or more of the first through third aspects, the channel switch announcement includes an indication of whether the channel switch announcement indicates the second time by indicating a target wake time service interval or a timing synchronization function time, e.g., as described in connection with FIG. 4 through FIG. 7.

In a fifth aspect, alone or in combination with one or more of the first through fourth aspects, transmitting the channel switch announcement further comprises transmitting the channel switch announcement to a plurality of stations, e.g., as described in connection with FIG. 4 through FIG. 7.

In a sixth aspect, alone or in combination with one or more of the first through fifth aspects, process 800 includes identifying, prior to the second time, that an acknowledgment has not been received from a particular station of the plurality of stations, and retransmitting, prior to the second time, the channel switch announcement indicating the time to the particular station, e.g., as described in connection with FIG. 4 through FIG. 7.

In a seventh aspect, alone or in combination with one or more of the first through sixth aspects, process 800 includes identifying, prior to the second time, that an acknowledgment has not been received from a particular station of the plurality of stations, e.g., as described in connection with FIG. 4 through FIG. 7.

In an eighth aspect, alone or in combination with one or more of the first through seventh aspects, the second time occurs after an immediate channel switch opportunity, e.g., as described in connection with FIG. 4 through FIG. 7.

In a ninth aspect, alone or in combination with one or more of the first through eighth aspects, the second time occurs after one or more retransmission opportunities for the channel switch announcement, e.g., as described in connection with FIG. 4 through FIG. 7.

In a tenth aspect, alone or in combination with one or more of the first through ninth aspects, transmitting the channel switch announcement further comprises transmitting the channel switch announcement via a personal area network, and performing the channel switch further comprises switching from a first channel associated with the personal area network to a second channel associated with the personal area network, e.g., as described in connection with FIG. 4 through FIG. 7.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
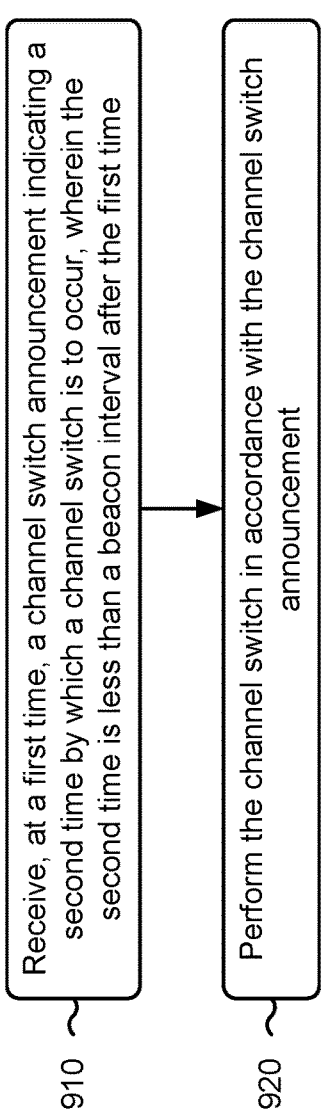
FIG. 9 is a diagram illustrating an example process performed, for example, by a wireless communication device, in accordance with the present disclosure.

FIG. 9 is a diagram illustrating an example process 900 performed, for example, by a wireless communication device, in accordance with the present disclosure. Example process 900 is an example where the wireless communication device (e.g., device 115, peripheral device 130) performs operations associated with a channel switch announcement.

As shown in FIG. 9, in some aspects, process 900 may include receiving, at a first time, a channel switch announcement indicating a second time by which a channel switch is to occur, wherein the second time is less than a beacon interval after the first time (block 910). For example, the wireless communication device (e.g., using reception component 1102 and/or communication manager 1106, depicted in FIG. 11) may receive, at a first time, a channel switch announcement indicating a second time by which a channel switch is to occur, wherein the second time is less than a beacon interval after the first time, as described above. In some aspects, the reception of the channel switch announcement may be performed in a manner similar to reception of the channel switch announcement 405 of FIG. 4, the channel switch announcement 505 of FIG. 5, and/or the channel switch announcement 605 of FIG. 6. The channel switch announcement may include information similar to that described in connection with FIG. 7.

As further shown in FIG. 9, in some aspects, process 900 may include performing the channel switch in accordance with the channel switch announcement (block 920). For example, the wireless communication device (e.g., using communication manager 1106, depicted in FIG. 11) may perform the channel switch in accordance with the channel switch announcement, as described above. In some aspects, the channel switch may be performed in a manner similar to that described in connection with the channel switch at 420 of FIG. 4, the channel switch at 525 of FIG. 5, and/or the channel switch at 625 of FIG. 6.

Process 900 may include additional aspects, such as any single aspect or any combination of aspects described below and/or in connection with one or more other processes described elsewhere herein.

In a first aspect, the channel switch announcement indicates the second time by indicating a target wake time service interval by which the channel switch is to occur, e.g., as described in connection with FIG. 4 through FIG. 7.

In a second aspect, alone or in combination with the first aspect, the channel switch announcement indicates a number of target wake time service intervals between the channel switch announcement and the target wake time service interval by which the channel switch is to occur, e.g., as described in connection with FIG. 4 through FIG. 7.

In a third aspect, alone or in combination with one or more of the first and second aspects, the channel switch announcement indicates the second time by indicating a timing synchronization function time by which the channel switch is to occur, e.g., as described in connection with FIG. 4 through FIG. 7.

In a fourth aspect, alone or in combination with one or more of the first through third aspects, the channel switch announcement includes an indication of whether the channel switch announcement indicates the time by indicating a target wake time service interval or a timing synchronization function time, e.g., as described in connection with FIG. 4 through FIG. 7.

In a fifth aspect, alone or in combination with one or more of the first through fourth aspects, the second time occurs after one or more retransmission opportunities for the channel switch announcement, e.g., as described in connection with FIG. 4 through FIG. 7.

In a sixth aspect, alone or in combination with one or more of the first through fifth aspects, receiving the channel switch announcement further comprises receiving the channel switch announcement via a personal area network, and performing the channel switch further comprises switching from a first channel associated with the personal area network to a second channel associated with the personal area network, e.g., as described in connection with FIG. 4 through FIG. 7.

In a seventh aspect, alone or in combination with one or more of the first through sixth aspects, the second time occurs after an immediate channel switch opportunity, e.g., as described in connection with FIG. 4 through FIG. 7.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
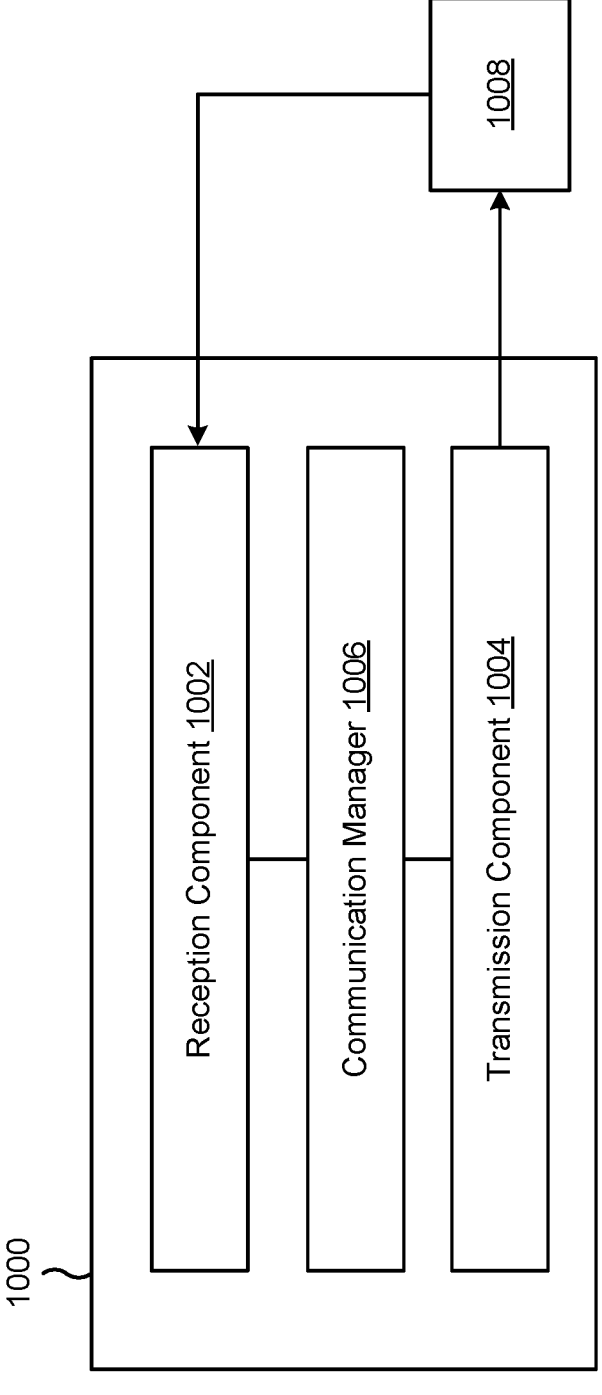
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a wireless communication device (e.g., a peripheral device), or a wireless communication device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1008 (such as a wireless communication device) using the reception component 1002 and the transmission component 1004. As further shown, the apparatus 1000 may include the communication manager 1006.

In some aspects, the apparatus 1000 may be configured to perform one or more operations described herein. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the device described in connection with FIG. 3. Additionally, or alternatively, one or more components shown in FIG. 10 may be implemented within one or more components described in connection with FIG. 3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a multiple-input multiple-output (MIMO) detector, a receive processor, a controller/processor, a memory, or a combination thereof, of the wireless communication device.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the wireless communication device. In some aspects, the transmission component 1004 may be co-located with the reception component 1002 in a transceiver.

The transmission component 1004 may transmit, at a first time, a channel switch announcement indicating a second time by which a channel switch is to occur, wherein the second time is less than a beacon interval after the first time. The communication manager 1006 may perform the channel switch in accordance with the channel switch announcement.

The communication manager 1006 may identify, prior to the time, that an acknowledgment has not been received from a particular station of the plurality of stations, and may retransmit, prior to the time, the channel switch announcement indicating the time to the particular station.

The communication manager 1006 may identify, prior to the time, that an acknowledgment has not been received from a particular station of the plurality of stations.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
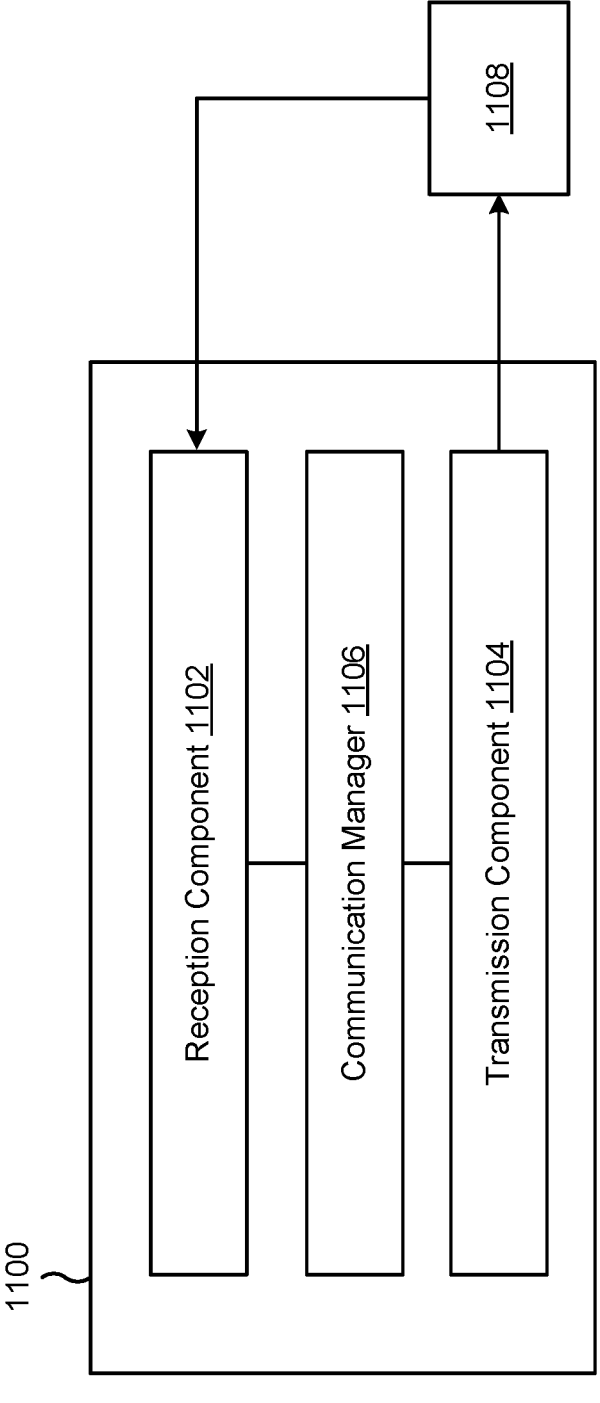
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a wireless communication device, or a wireless communication device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1108 (such as a peripheral device and/or another wireless communication device) using the reception component 1102 and the transmission component 1104. As further shown, the apparatus 1100 may include the communication manager 1106.

In some aspects, the apparatus 1100 may be configured to perform one or more operations described herein. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the device described in connection with FIG. 3. Additionally, or alternatively, one or more components shown in FIG. 11 may be implemented within one or more components described in connection with FIG. 3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the wireless communication device.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the wireless communication device. In some aspects, the transmission component 1104 may be co-located with the reception component 1102 in a transceiver.

The reception component 1102 may receive, at a first time, a channel switch announcement indicating a second time by which a channel switch is to occur, wherein the second time is less than a beacon interval after the first time. The communication manager 1106 may perform the channel switch in accordance with the channel switch announcement.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a wireless communication device, comprising: transmitting, at a first time, a channel switch announcement indicating a second time by which a channel switch is to occur, wherein the second time is less than a beacon interval after the first time; and performing the channel switch in accordance with the channel switch announcement.

Aspect 2: The method of Aspect 1, wherein the channel switch announcement indicates the second time by indicating a target wake time service interval by which the channel switch is to occur.

Aspect 3: The method of Aspect 2, wherein the channel switch announcement indicates a number of target wake time service intervals between the channel switch announcement and the target wake time service interval by which the channel switch is to occur.

Aspect 4: The method of Aspect 1, wherein the channel switch announcement indicates the second time by indicating a timing synchronization function time by which the channel switch is to occur.

Aspect 5: The method of any of Aspects 1-4, wherein the channel switch announcement includes an indication of whether the channel switch announcement indicates the second time by indicating a target wake time service interval or a timing synchronization function time.

Aspect 6: The method of any of Aspects 1-5, wherein transmitting the channel switch announcement further comprises transmitting the channel switch announcement to a plurality of stations.

Aspect 7: The method of Aspect 6, further comprising identifying, prior to the second time, that an acknowledgment has not been received from a particular station of the plurality of stations; and retransmitting, prior to the second time, the channel switch announcement indicating the second time to the particular station.

Aspect 8: The method of Aspect 6, further comprising: identifying, prior to the second time, that an acknowledgment has not been received from a particular station of the plurality of stations.

Aspect 9: The method of any of Aspects 1-8, wherein the second time occurs after an immediate channel switch opportunity.

Aspect 10: The method of any of Aspects 1-9, wherein the second time occurs after one or more retransmission opportunities for the channel switch announcement.

Aspect 11: The method of any of Aspects 1-10, wherein transmitting the channel switch announcement further comprises transmitting the channel switch announcement via a personal area network, and performing the channel switch further comprises switching from a first channel associated with the personal area network to a second channel associated with the personal area network.

Aspect 12: A method of wireless communication performed by a wireless communication device, comprising: receiving, at a first time, a channel switch announcement indicating a second time by which a channel switch is to occur, wherein the second time is less than a beacon interval after the first time; and performing the channel switch in accordance with the channel switch announcement.

Aspect 13: The method of Aspect 12, wherein the channel switch announcement indicates the second time by indicating a target wake time service interval by which the channel switch is to occur.

Aspect 14: The method of Aspect 13, wherein the channel switch announcement indicates a number of target wake time service intervals between the channel switch announcement and the target wake time service interval by which the channel switch is to occur.

Aspect 15: The method of Aspect 12, wherein the channel switch announcement indicates the second time by indicating a timing synchronization function time by which the channel switch is to occur.

Aspect 16: The method of any of Aspects 12-15, wherein the channel switch announcement includes an indication of whether the channel switch announcement indicates the second time by indicating a target wake time service interval or a timing synchronization function time.

Aspect 17: The method of any of Aspects 12-16 wherein the second time occurs after an immediate channel switch opportunity.

Aspect 18: The method of any of Aspects 12-17, wherein the second time occurs after one or more retransmission opportunities for the channel switch announcement.

Aspect 19: The method of any of Aspects 12-18, wherein receiving the channel switch announcement further comprises receiving the channel switch announcement via a personal area network, and performing the channel switch further comprises switching from a first channel associated with the personal area network to a second channel associated with the personal area network.

Aspect 20: An apparatus for wireless communication at a device, comprising a processor; memory coupled with the processor; and instructions stored in the memory and executable by the processor to cause the apparatus to perform the method of one or more of Aspects 1-19.

Aspect 21: A device for wireless communication, comprising a memory and one or more processors coupled to the memory, the one or more processors configured to perform the method of one or more of Aspects 1-19.

Aspect 22: An apparatus for wireless communication, comprising at least one means for performing the method of one or more of Aspects 1-19.

Aspect 23: A non-transitory computer-readable medium storing code for wireless communication, the code comprising instructions executable by a processor to perform the method of one or more of Aspects 1-19.

Aspect 24: A non-transitory computer-readable medium storing a set of instructions for wireless communication, the set of instructions comprising one or more instructions that, when executed by one or more processors of a device, cause the device to perform the method of one or more of Aspects 1-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:

one or more memories; and one or more processors, coupled to the one or more memories, configured to:

transmit, at a first time, a channel switch announcement indicating a second time by which a channel switch is to occur, wherein the second time is less than a beacon interval after the first time, and wherein the channel switch announcement includes an indication of whether the second time is indicated by a target wake time service interval or a timing synchronization function time; and perform the channel switch in accordance with the channel switch announcement.

2. The wireless communication device of claim 1, wherein the channel switch announcement indicates the second time by indicating a first target wake time service interval by which the channel switch is to occur.

3. The wireless communication device of claim 2, wherein the channel switch announcement indicates a number of target wake time service intervals between the channel switch announcement and the first target wake time service interval by which the channel switch is to occur.

4. The wireless communication device of claim 1, wherein the channel switch announcement indicates the second time by indicating a first timing synchronization function time by which the channel switch is to occur.

5. The wireless communication device of claim 1, wherein the one or more processors, to transmit the channel switch announcement, are configured to transmit the channel switch announcement to a plurality of stations.

6. The wireless communication device of claim 5, wherein the one or more processors are further configured to identify, prior to the second time, that an acknowledgment has not been received from a particular station of the plurality of stations; and retransmit, prior to the second time, the channel switch announcement indicating the second time to the particular station.

7. The wireless communication device of claim 5, wherein the one or more processors are further configured to:

identify, prior to the second time, that an acknowledgment has not been received from a particular station of the plurality of stations.

8. The wireless communication device of claim 1, wherein the second time occurs after an immediate channel switch opportunity.

9. The wireless communication device of claim 1, wherein the second time occurs after one or more retransmission opportunities for the channel switch announcement.

10. The wireless communication device of claim 1, wherein the one or more processors, to transmit the channel switch announcement, are configured to transmit the channel switch announcement via a personal area network, and the one or more processors are further configured to switch from a first channel associated with the personal area network to a second channel associated with the personal area network.

11. A wireless communication device for wireless communication, comprising:

one or more memories; and one or more processors, coupled to the one or more memories, configured to:

receive, at a first time, a channel switch announcement indicating a second time by which a channel switch is to occur, wherein the second time is less than a beacon interval after the first time, and wherein the channel switch announcement includes an indication of whether the second time is indicated by a target wake time service interval or a timing synchronization function time; and perform the channel switch in accordance with the channel switch announcement.

12. The wireless communication device of claim 11, wherein the channel switch announcement indicates the second time by indicating a first target wake time service interval by which the channel switch is to occur.

13. The wireless communication device of claim 12, wherein the channel switch announcement indicates a number of target wake time service intervals between the channel switch announcement and the first target wake time service interval by which the channel switch is to occur.

14. The wireless communication device of claim 11, wherein the channel switch announcement indicates the second time by indicating a first timing synchronization function time by which the channel switch is to occur.

15. The wireless communication device of claim 11, wherein the second time occurs after an immediate channel switch opportunity.

16. The wireless communication device of claim 11, wherein the second time occurs after one or more retransmission opportunities for the channel switch announcement.

17. The wireless communication device of claim 11, wherein the one or more processors, to receive the channel switch announcement, are configured to receive the channel switch announcement via a personal area network, and the one or more processors, to perform the channel switch, are configured to switch from a first channel associated with the personal area network to a second channel associated with the personal area network.

18. A method of wireless communication performed by a wireless communication device, comprising:

transmitting, at a first time, a channel switch announcement indicating a second time by which a channel switch is to occur, wherein the second time is less than a beacon interval after the first time, and wherein the channel switch announcement includes an indication of whether the second time is indicated by a target wake time service interval or a timing synchronization function time; and performing the channel switch in accordance with the channel switch announcement.

19. The method of claim 18, wherein the channel switch announcement indicates the second time by indicating a first target wake time service interval by which the channel switch is to occur.

20. The method of claim 19, wherein the channel switch announcement indicates a number of target wake time service intervals between the channel switch announcement and the first target wake time service interval by which the channel switch is to occur.

21. The method of claim 18, wherein the channel switch announcement indicates the second time by indicating a first timing synchronization function time by which the channel switch is to occur.

22. The method of claim 18, wherein transmitting the channel switch announcement further comprises transmitting the channel switch announcement to a plurality of stations.

23. The method of claim 22, further comprising identifying, prior to the second time, that an acknowledgment has not been received from a particular station of the plurality of stations; and retransmitting, prior to the second time, the channel switch announcement indicating the second time to the particular station.

24. The method of claim 22, further comprising:

identifying, prior to the second time, that an acknowledgment has not been received from a particular station of the plurality of stations.

25. The method of claim 18, wherein the second time occurs after an immediate channel switch opportunity.

26. The method of claim 18, wherein the second time occurs after one or more retransmission opportunities for the channel switch announcement.

27. The method of claim 18, wherein transmitting the channel switch announcement further comprises transmitting the channel switch announcement via a personal area network, and performing the channel switch further comprises switching from a first channel associated with the personal area network to a second channel associated with the personal area network.

28. A method of wireless communication performed by a wireless communication device, comprising:

receiving, at a first time, a channel switch announcement indicating a second time by which a channel switch is to occur, wherein the second time is less than a beacon interval after the first time, and wherein the channel switch announcement includes an indication of whether the second time is indicated by a target wake time service interval or a timing synchronization function time; and performing the channel switch in accordance with the channel switch announcement.

29. The method of claim 28, wherein the channel switch announcement indicates the second time by indicating a first target wake time service interval by which the channel switch is to occur.

30. The method of claim 29, wherein the channel switch announcement indicates a number of target wake time service intervals between the channel switch announcement and the first target wake time service interval by which the channel switch is to occur.

30

31. The method of claim 28, wherein the channel switch announcement indicates the second time by indicating a first timing synchronization function time by which the channel switch is to occur.

32. The method of claim 28, wherein the second time occurs after an immediate channel switch opportunity.

33. The method of claim 28, wherein the second time occurs after one or more retransmission opportunities for the channel switch announcement.

34. The method of claim 28, wherein receiving the channel switch announcement further comprises receiving the channel switch announcement via a personal area network, and performing the channel switch further comprises switching from a first channel associated with the personal area network to a second channel associated with the personal area network.

* * * * *